United States Patent
Charles et al.

(10) Patent No.: US 12,199,878 B2
(45) Date of Patent: Jan. 14, 2025

(54) CONTROLLING STORAGE ARRAY DATA TRANSMISSIONS

(71) Applicant: EMC IP Holding Company LLC, Hopkinton, MA (US)

(72) Inventors: Peniel Charles, Bangalore (IN); Joseph Kanjirathinkal, Cary, NC (US); Owen Crowley, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 410 days.

(21) Appl. No.: 17/236,695

(22) Filed: Apr. 21, 2021

(65) Prior Publication Data
US 2022/0345409 A1    Oct. 27, 2022

(51) Int. Cl.
| | | |
|---|---|---|
| *H04L 12/851* | (2013.01) | |
| *G06N 5/04* | (2023.01) | |
| *G06N 20/00* | (2019.01) | |
| *H04L 47/24* | (2022.01) | |
| *H04L 47/263* | (2022.01) | |

(52) U.S. Cl.
CPC .............. *H04L 47/24* (2013.01); *G06N 5/04* (2013.01); *G06N 20/00* (2019.01); *H04L 47/263* (2013.01)

(58) Field of Classification Search
CPC ....... H04L 47/24; H04L 47/263; G06N 20/00; G06N 5/04
USPC ........................................................ 370/465
See application file for complete search history.

(56) References Cited

U.S. PATENT DOCUMENTS

| | | | | |
|---|---|---|---|---|
| 8,619,600 | B2* | 12/2013 | Morrill | H04L 45/123 370/395.42 |
| 10,642,715 | B1* | 5/2020 | Simca | G06F 11/3612 |
| 2007/0036168 | A1* | 2/2007 | Hsiao | H04L 47/621 370/412 |
| 2013/0170451 | A1* | 7/2013 | Krause | H04W 72/542 370/329 |
| 2013/0262648 | A1* | 10/2013 | Orlik | H04W 28/0236 709/223 |
| 2013/0315062 | A1* | 11/2013 | Riedl | H04L 47/50 370/230 |
| 2014/0105012 | A1* | 4/2014 | Lavian | H04L 47/50 370/230 |
| 2015/0171968 | A1* | 6/2015 | Featherston | H04B 10/1123 398/118 |
| 2020/0112472 | A1* | 4/2020 | Fonseca De Oliveira | H04L 65/80 |

\* cited by examiner

*Primary Examiner* — Christopher M Crutchfield
*Assistant Examiner* — Jean F Voltaire
(74) *Attorney, Agent, or Firm* — Krishnendu Gupta; Nikhil Patel

(57) ABSTRACT

An aspect of the present disclosure relates to using at least one service-level objective (SLO) to control data communications between two or more devices over a network. In embodiments, a notification is received by a source device. The notification can include status information of at least one of a plurality of communication paths between the source device and a target device. A communications control technique can be performed based on the indicated status. The communications control technique can include prioritizing one or more data packets based on a data payload corresponding to each packet. The technique can also include controlling the transmission of one or more data packets based on each data packet's priority.

20 Claims, 5 Drawing Sheets

CONTROLLING STORAGE ARRAY DATA TRANSMISSIONS

BACKGROUND

Internet Protocol (IP) refers to rules governing how network devices transmit data packets over a communications network. Transmission Control Protocol (TCP) is a standard that defines how to establish and maintain a network conversation through which application programs can exchange data (i.e., the Transport Layer of IP). Together, TCP and IP (i.e., TCP/IP) provide standards transmitting data packets. TCP provides reliable, ordered, and error-checked delivery of a stream of octets (bytes) between applications communicating via an IP network. Major internet applications such as the World Wide Web, email, remote administration, and file transfer rely on TCP.

SUMMARY

An aspect of the present disclosure relates to using at least one service-level objective (SLO) to control data communications between two or more devices over a network. In embodiments, a notification is received by a source device. The notification can include status information of at least one of a plurality of communication paths between the source device and a target device. A communications control technique can be performed based on the indicated status. The communications control technique can include prioritizing one or more data packets based on a data payload corresponding to each data packet. The communications control technique can also include controlling transmission of one or more of the data packets based on each data packet's priority.

In embodiments, a throughput level of one or more communication of the paths using the status information can be determined.

In embodiments, one or more of the data packets can be grouped based on each packet's priority.

In embodiments, each group of one or more of the data packets can be assigned to at least one communication path using the status information.

In embodiments, each group of data packets' transmission rate can be controlled based on the status information.

In embodiments, communication status patterns can be identified using historical and/or current communication path notifications and related information.

In embodiments, one or more data transmission models can be generated from the identified patterns.

In embodiments, one or more of the data packets' transmission rate uses one or more data transmission models.

In embodiments, one or more machine learning (ML) techniques can be used to identify the communication status patterns.

In embodiments, one or more data transmission models can be adjusted based on one or more transmission feedback notifications received from the target device.

BRIEF DESCRIPTION OF THE DRAWINGS

The preceding and other objects, features, and advantages will be apparent from the following more particular description of the embodiments, as illustrated in the accompanying drawings. Like reference characters refer to the same parts throughout the different views. The drawings are not necessarily to scale, emphasis instead being placed upon illustrating the embodiments' principles.

DETAILED DESCRIPTION

Conventionally, TCP/IP networks signal congestion by dropping packets that could have critical data. Thus, TCP/IP congestion often causes data loss during a communications session between a source device and a destination device. In response to such data loss, the source device can reattempt the transmission of lost data packets, thereby increasing data transmission time.

A communications protocol can use an IP extension to address some aspects of TCP/IP congestion. For example, communication nodes in a communications path between the source device and destination device can mark a data packet's IP header with a network congestion indication in response to the source device. Upon receiving the network congestion indication, the source device can reduce data transmission.

Based on network congestion levels, the present disclosure's embodiments can throttle communications from a source array to a destination array. For instance, the embodiments can throttle one or more data packets based on their respective priority levels, as described in greater detail herein.

Figure 1:
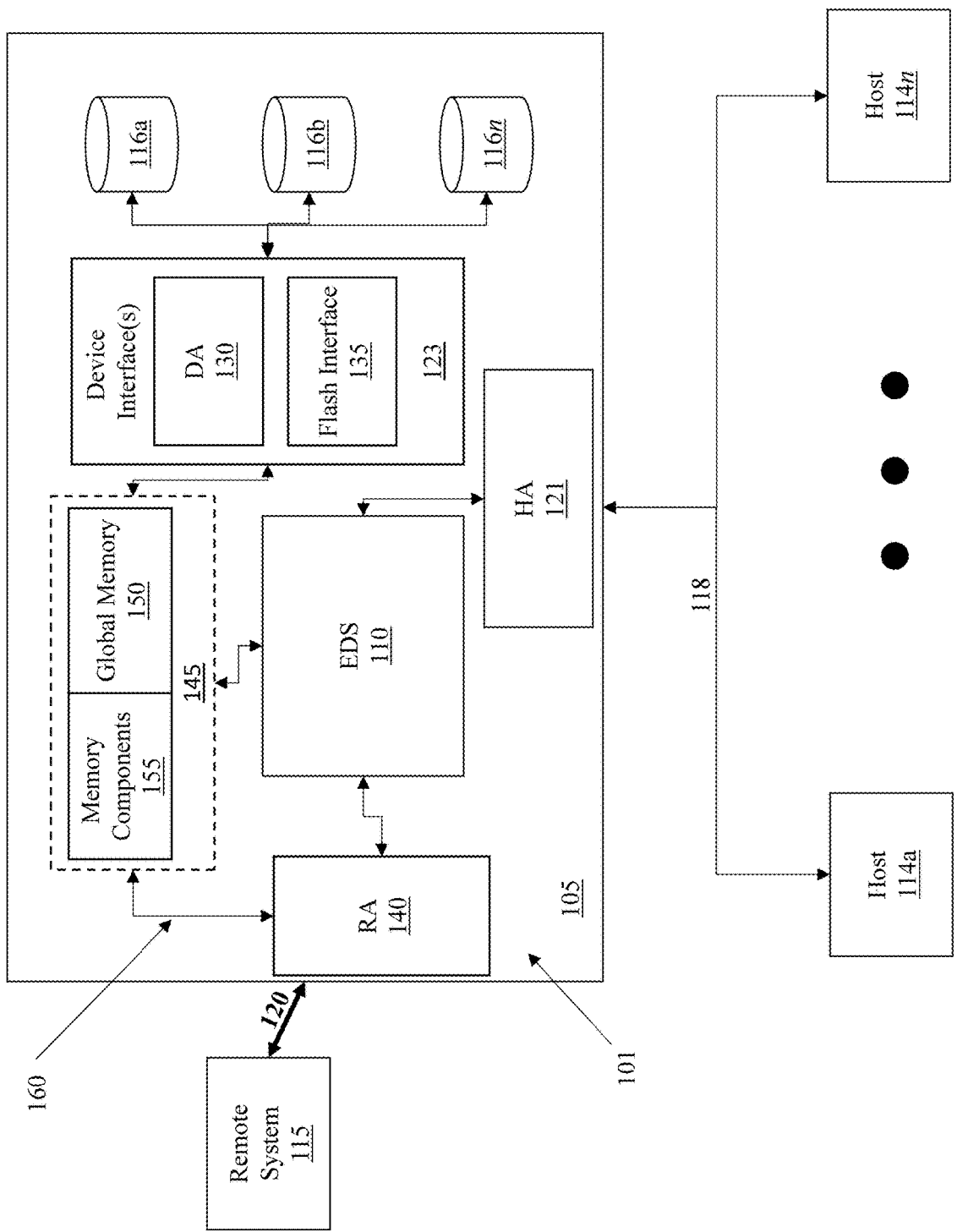
FIG. 1 is a block diagram of a storage array in accordance with embodiments of the present disclosure.

Referring to FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, and/or communication modules. For example, the array's global memory 150 can use the communication channels 160 to transfer data and/or send other communications between the array's components 101.

In embodiments, the array 105 and one or more devices can form a network. For example, a first communication network 118 can communicatively couple the array 105 to one or more host systems 114*a-n*. Likewise, a second communication network 120 can communicatively couple the array 105 to a remote system 115. The first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114*a-n* and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115*a-n*, and the like can connect to the first and/or second networks 118, 120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114*a-n*. The hosts 114*a-n* and the array 105 can be physically co-located or located remotely from one another. In embodiments, an IO request can include a read/write request. For example, an application executing on one of the hosts 114*a-n* can perform a read or write operation resulting in one or more data requests to the array 105. The IO workload can correspond to IO requests received by the array 105 over a time interval.

In embodiments, the array 105 and remote system 115 can include any one of a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. The memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114*a-n*). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116*a-n*. For example, the data storage interface 123 can include a device adapter (DA) 130 (e.g., storage device controller), flash drive interface 135, and the like that controls access to the storage devices 116*a-n*. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116*a-n* can include one or more data storage types, each having distinct performance capabilities. For example, the storage devices 116*a-n* can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile and/or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM and the like. Like the array's storage devices 116*a-n*, the array's memory 145 can have different storage performance capabilities.

In embodiments, a service level agreement (SLA) can define at least one Service Level Objective (SLO) the hosts 114*a-n* expect the array 105 to achieve. For example, the hosts 115*a-n* can include host-operated applications. The host-operated applications can generate data for the array 105 to store and/or read data the array 105 stores. The hosts 114*a-n* can assign different levels of business importance to data types they generate or read. As such, each SLO can define a service level (SL) for each data type the hosts 114*a-n* write to and/or read from the array 105. Further, each SL can define the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114*a-n* with logical representations of the array's physical storage devices 116*a-n* and memory 145 rather than giving their respective physical address spaces. For example, the EDS 110 can establish at least one logical unit number (LUN) representing a slice or portion of a configured set of disks (e.g., storage devices 116*a-n*). The array 105 can present one or more LUNs to the hosts 114*a-n*. For example, each LUN can relate to at least one physical address space of storage. Further, the array 105 can mount (e.g., group) one or more LUNs to define at least one logical storage device (e.g., logical volume (LV)).

In further embodiments, the HA 121 can receive an IO request that identifies one or more of the array's storage tracks. Accordingly, the HA 121 can parse that information from the IO request to route the request's related data to its target storage track. In other examples, the array 105 may not have previously associated a storage track to the IO request's related data. The array's DA 130 can assign at least one storage track to service the IO request's related data in such circumstances. In embodiments, the DA 130 can assign each storage track with a unique track identifier (TID). Accordingly, each TID can correspond to one or more physical storage address spaces of the array's storage devices 116*a-n* and/or global memory 145. The HA 121 can store a searchable data structure that identifies the relationships between each LUN, LV, TID, and/or physical address space. For example, a LUN can correspond to a portion of a storage track, while an LV can correspond to one or more LUNs and a TID corresponds to an entire storage track.

In embodiments, the array's RA 140 can manage communications between the array 105 and an external storage system (e.g., remote system 115) using a communications protocol. For example, the first network 118 and/or second network 120 can be an Explicit Congestion Notification (ECN) Enabled Ethernet network. Additionally, the RA 140 can identify at least one state of the second network 120. Based on the identified state, the RA 140 can prioritize data frames queued for transmission to the remote system 115 as described in greater detail herein based on each identified state.

Figure 2:
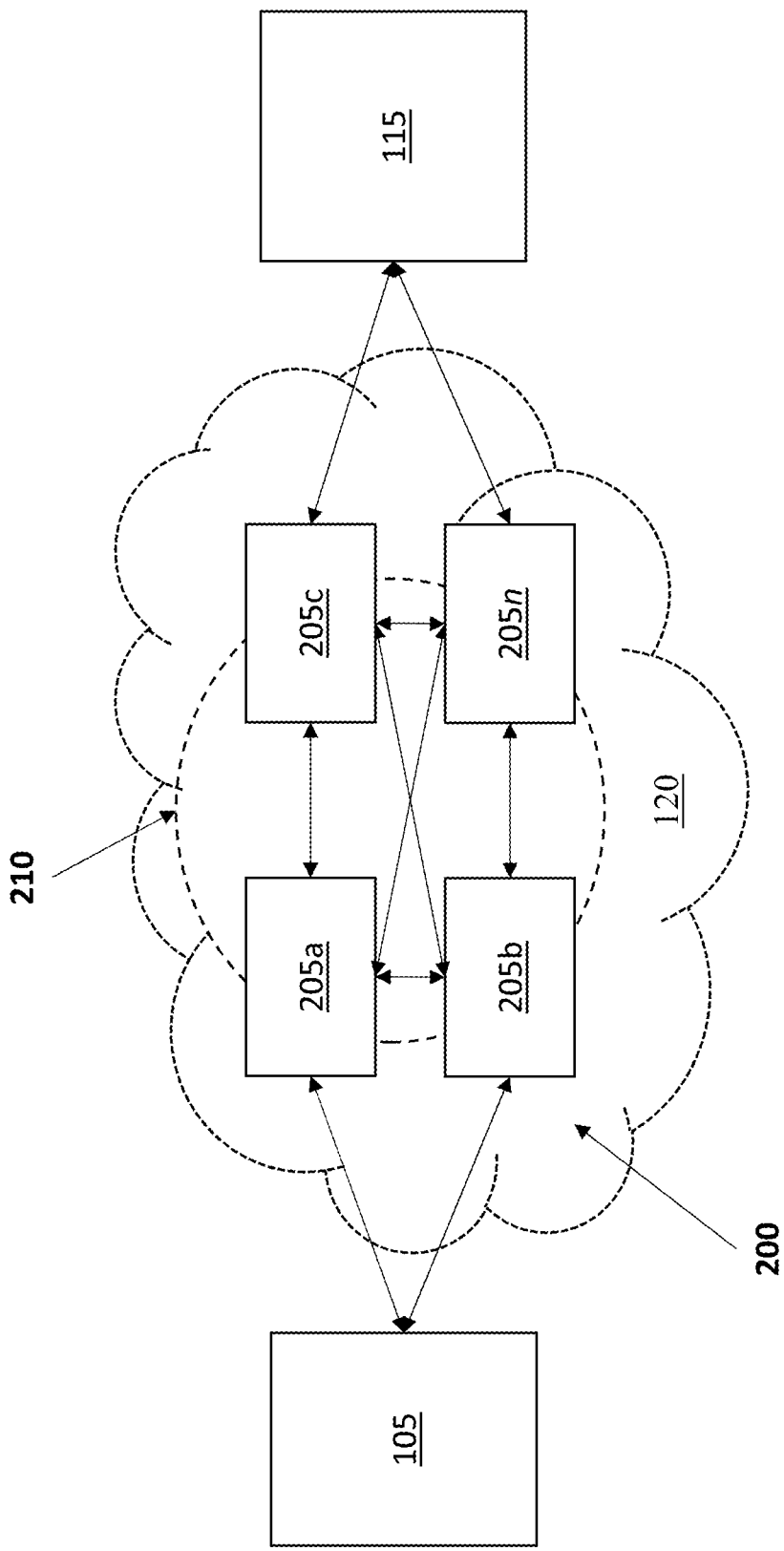
FIG. 2 is a block diagram of a communications network in accordance with embodiments of the present disclosure

Regarding FIG. 2, the remote network 120 can include one or more interconnected nodes 205a-n that define a structure and flow of information between devices on the second network 120 (network devices). For example, the second network 120 can interconnect the nodes 205a-n using links 210. The links 210 can allow the nodes 205a-n to exchange messages using one or more communications protocols. The communications protocols can define a method (e.g., rules, syntax, semantics, and the like) by which the nodes 205a-n can pass messages and signals to other networked devices. Further, the protocol can define a communications synchronization process and error recovery methods. The second network 120 can implement the protocol using hardware, software, or a combination of both. The protocol's rules, syntax, and semantics can include, e.g., a circuit switching, message switching, and/or packet switching technique. In embodiments, the nodes 205a-n can comprise networking hardware such as computing nodes (e.g., computers), servers, networking hardware, bridges, switches, hubs, and the like.

The second network 120 can arrange the nodes 205a-n to define one or more of a Chain Network (CHN), Y-Network (YN), Wheel Network (WN), Circle Network (CIRN), All-Channel Network (ACN) such as a Star Network, and the like. In a CHN, the nodes 205a-n have a hierarchical relationship (e.g., topology) that requires communications to flow through a formal chain. In a YN, the nodes 205a-n have a topology resembling an upside-down 'Y' (e.g., information flows upward and downward through the hierarchy). In a WN, data flows to and from a networked device (e.g., array 105). In a CIRN, the nodes 205a-n have a topology that restricts the flow of information to/from one node of the nodes to an adjacent node (e.g., a neighboring node). In embodiments, each node can have at most two adjacent nodes. In an ACN, the nodes 205a-n have a structure that allows communications to flow upward, downward, and laterally among each node. As illustrated, the second network 120 can have an arrangement 200 that is consistent with an ACN. In embodiments, the second network 120 can define one or more communication paths (e.g., paths 305a-n of FIG. 3) between the array 105 and the remote system 115, as described in greater detail herein.

Figure 3:
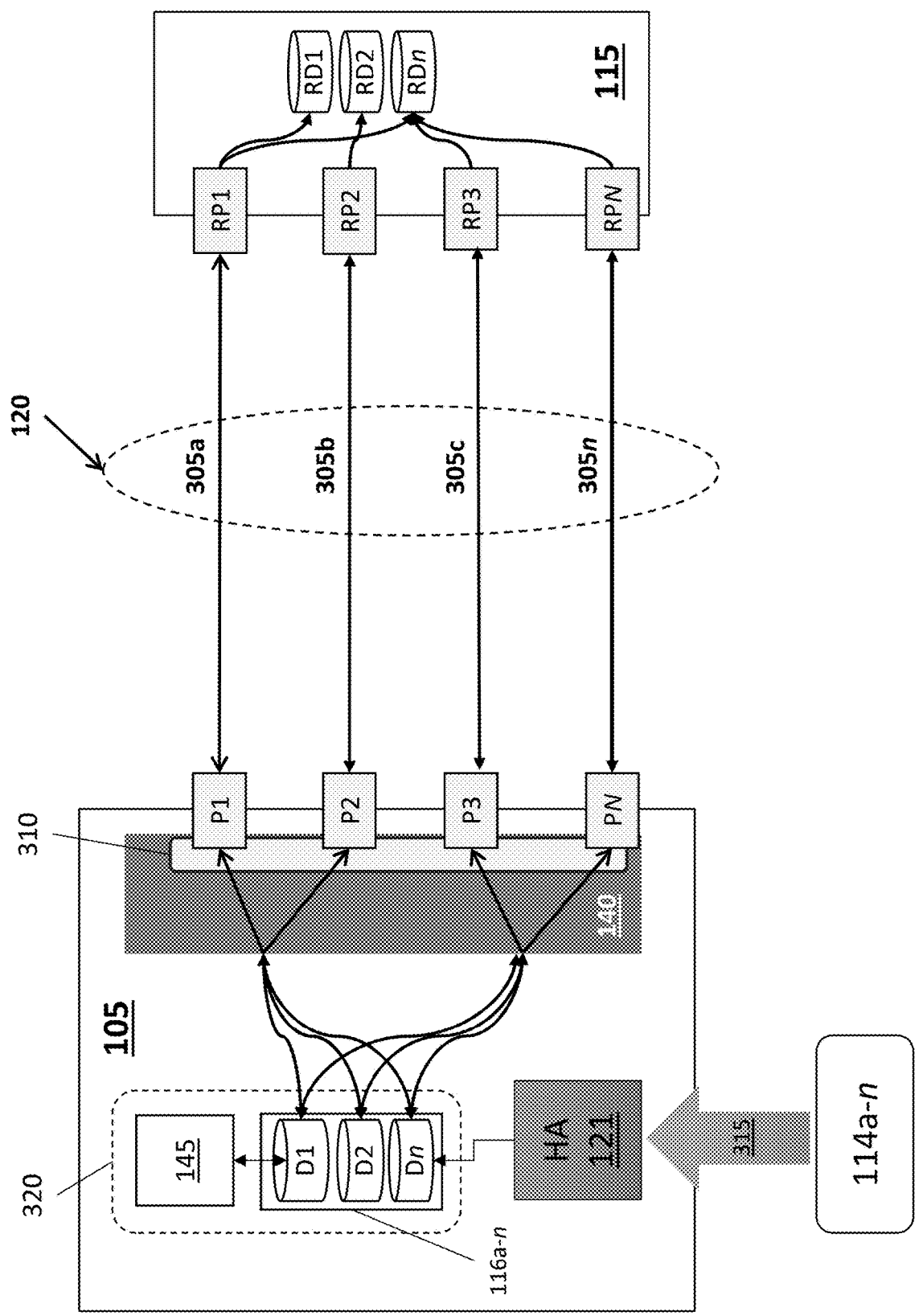
FIG. 3 is a block diagram of logical communication paths over a communications network in accordance with embodiments of the present disclosure.

Regarding FIG. 3, the array's HA 121 can receive an IO workload 315 from at least one of the hosts 114a-n. The IO workload 315 can include one or more IO requests. In embodiments, the IO's request can include data for the array 105 to store using at least a portion of its storage resources (e.g., memory 145 and/or devices 116a-n of FIG. 1). For example, each IO can include information identifying virtual storage 320 representing a portion (e.g., slice) of the array's memory 145 and/or devices 116a-n.

In embodiments, the backup manager 310 can identify one or more received IO requests to queue for transmission to the remote system 115. For instance, the backup manager 310 can include a searchable data structure that defines each of the array's address spaces it should backup (e.g., mirror) on the remote system 115. Thus, the backup manager 310 can queue data backup transmissions based on each of the workload's IO-identified virtual storage 320. In other embodiments, each IO can include metadata instructing the backup manager 310 to mirror its related data on the remote system 115.

In embodiments, the backup manager 310 can include one or more network interfaces (e.g., ports P1-n) that communicatively couple the array 105 and the t remote system 115 over the network 120. Using at least one transmission policy (e.g., a transmission model), the backup manager 310 can control data backup transmissions to the remote system 115. For instance, the backup manager 310 can assign queued data to one or more of the ports P1-n that route data to the remote array 115 over one or more network paths 305a-n.

In embodiments, the backup manager 310 can issue search signals (e.g., discovery packets) that include destination information of a networked device (e.g., the remote system 115, nodes 205a-n, and any other device connected to the network 120). For example, the backup manager 310 can issue a search signal to the remote system 115 using the remote system's location identifier (e.g., IP network address). The search signal can traverse one or more of the nodes 205a-n via the network's communications links 210. During the search signal's travel to the remote system 115, it can maintain a travel log of each network device it traverses over the network 120. The signal can store the travel log in a communications layer defined by the network's configured communications protocol (e.g., TCP/IP).

In response to receiving the search signal, the remote system 115 can issue a response signal to the array 105. The search signal can include instructions the remote system 115 can use to transmit a response signal. For example, the backup manager 310 can provide the search signal with instructions defining a return path the remote system 115 can use to issue its response signal. The return path can define a trace of the search signal's travel path. For instance, the trace can define a reverse sequence of the search signal's device sequence travel path. In another embodiment, the return path can define, e.g., one or more network devices and a device return path sequence for the response signal to avoid. For example, the response signal can use the search signal's travel log to ensure that it avoids at least one of the search signal's traversed nodes.

In embodiments, the response signal can also record information related to the nodes 205a-n and corresponding links 210 it traverses through the network 120. Further, the search and response signals can record transmission and reception timestamps in their respective travel logs. The backup manager 310 can use the timestamps to determine one or more transmission-related parameters (e.g., response times and network congestion).

Using one or more search and response signals' respective travel logs, the backup manager 310 can identify one or more network paths 305a-n to/from the remote system 115. Accordingly, the backup manager 310 can associate each of the array's ports P1-N with one or more of the paths 305a-n. Further, the backup manager 310 can associate each of the array's ports P1-N with one or more of the remote system's ports RP1-N. For instance, the remote system's response signals can identify its remote system transmission port's network address (e.g., one of the ports RP1-N). Accordingly, the manager 310 can generate a data structure that indentifies each of the remote system's ports and their respective network addresses. Further, the manager 310 can configure each of the ports P1-N to send data packets to a destination address corresponding to the port's associated remote system port.

In embodiments, the backup manager 310 can control data transmission to the remote system 115 based on IO transmission queue volumes and/or status of the paths 305a-n. For example, the manager 310 can determine the throughput level of each communication path's status information. Further, the backup manager 310 can generate data transmission packets and group them based on the IO-related data's priority (e.g., service level). Additionally, the manager 310 can control each group of data packets' transmission rates based on at least the status information described in greater detail herein.

Figure 4:
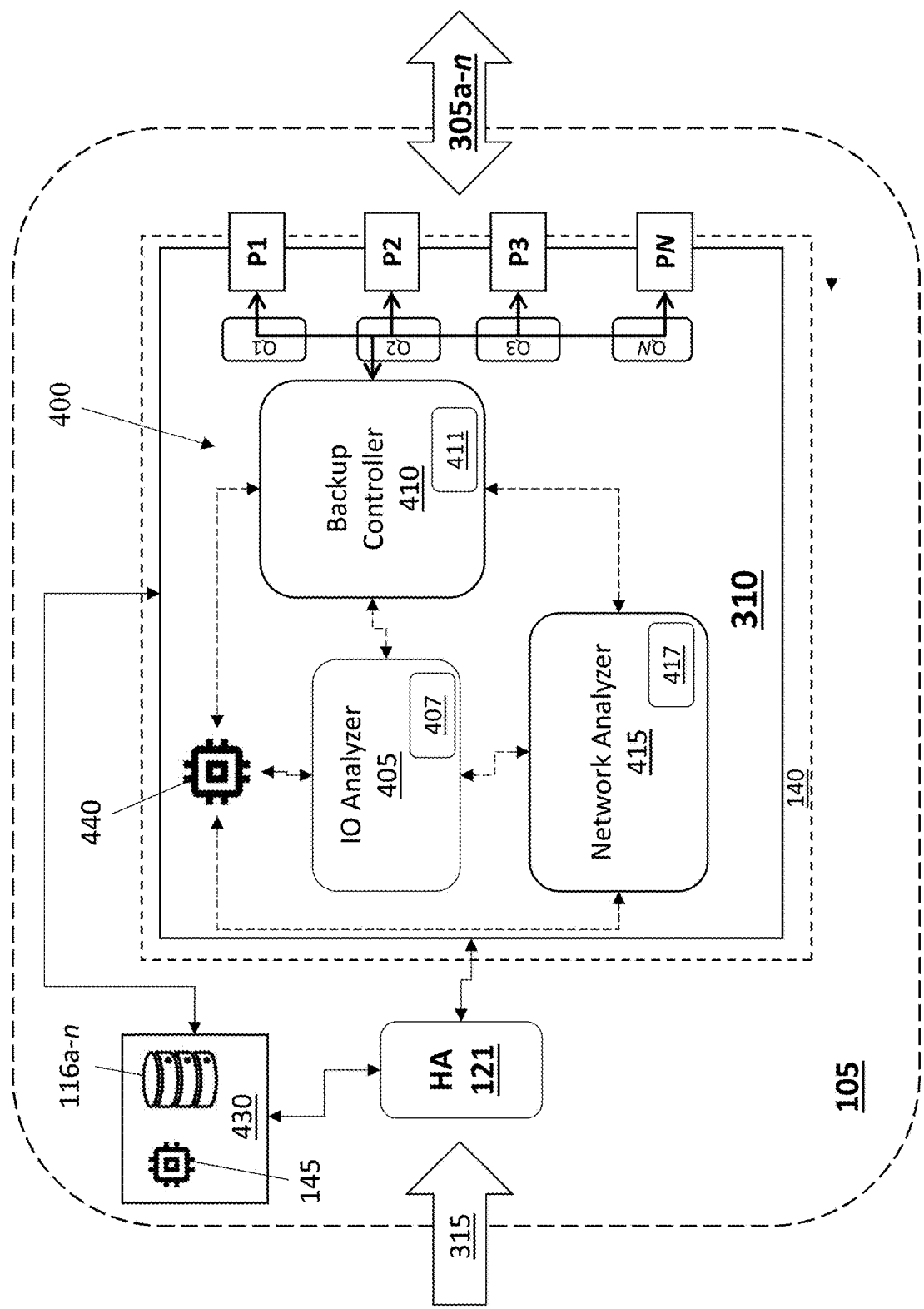
FIG. 4 is a block diagram of a remote adapter in accordance with embodiments of the present disclosure

Regarding FIG. 4, an HA 121 can manage an IO workload 315 received from one or more of the hosts 114a-n. For example, the IO workload 315 can include one or more IO read/write operations. The IO read/write operations can identify one or more portions (e.g., slices) of the array's storage resources 430. The resources 320 can include data tracks from the array's storage devices 116a-n and/or memory 145. For example, an IO write operation can reference at least one track identifier (TID) corresponding to at least one of the array's data tracks. An IO write operation can include new for the array 105 to store. Additionally, an IO write operation can include additions or changes to information the array 105 has been storing. Furthermore, the hosts 114a-n can request/require a remote backup of the new information or updated information.

In embodiments, the RA 140 can comprise a backup manager 310 that includes one or more mirroring components 400 (e.g., hardware and/or software elements). The mirroring components 400 can perform one or more data backup or mirroring operations. Further, the backup manager 310 can include a commercially available processor, e.g., an Intel-based processor, parallel processor (e.g., graphical processing unit (GPU)), and the like. Although the mirroring components 400, as illustrated, reside within the backup manager 310, one or more of the mirroring components 400 can reside in at least one of the array's other components 101 (e.g., HA 121, EDS 110, and the like).

In embodiments, the mirroring components 400 can include an IO analyzer 405 having logic and/or circuitry to monitor and analyze the IO workload 315. For example, the analyzer 405 can communicatively couple to the HA 121 to monitory and analyze the IO workload 315. Further, the analyzer 405 can analyze each of the workload's IO requests and identify each request's characteristics. In embodiments, each IO request can include metadata defining each IO's characteristics. The IO characteristics can correspond to the IO's type, SL, write track identifier (TID), performance metrics, telemetry data, data mirroring flag, and the like.

In embodiments, the analyzer 405 can identify whether each of the workload's IO write requests corresponds to data requiring remote backup (e.g., mirroring). For example, each IO request can include a boolean parameter (e.g., a backup flag) that identifies whether the IO request's related data requires remote backup. In other embodiments, the analyzer 405 can access a searchable backup data structure that identifies whether the IO's related data requires remote backup. For example, the data structure can associate TIDs with a data backup requirement. For instance, TIDs corresponding to the array's fast storage tiers can likely require remote backup. As stated herein, the array's fast storage tiers generally service host-identified critical and valuation information with high service levels (e.g., fast response time requirements). Given the information's critical and valuation nature, the hosts 114a-n are likely to require a remote backup to mitigate any events resulting in data loss.

In other embodiments, the IO analyzer 405 can logically associate each port P1-N with storage tracks related to one of the array's storage tiers. Using the association, the IO analyzer 405 can monitor workloads at a track level of each storage device 116a-n and portion of the memory 145.

The analyzer 405 can also identify IO patterns using its monitored IO information. The monitored IO information can include the analyzer's IO workload analysis, historical IO data, current IO data, IO characteristic data, and the array's state metrics. The analyzer's machine learning (ML) engine 407 can use one or more self-learning techniques to identify the IO patterns. Further, the ML engine 407 can generate one or more workload models by ingesting the identified IO patterns. The workload models can include workload predictions that predict IO workloads and their respective characteristics. The analyzer 405 can anticipate periods during which the array 105 is likely to experience intensive workloads from the predicted workload characteristics. For example, the analyzer 405 can identify the IO workload 315 as intensive if it includes one or more periods the array 105 receives a large volume of IOs per second (IOPS). The analyzer 405 can store information related to the IO patterns, workload models, IO characteristics, and the like in the processor's local memory 440.

In embodiments, the backup manager 310 can enable the network 120 and the network nodes 205a-n to mark data transmissions with their respective throughput (or congestion) levels. The data transmissions can include any of the array's data backup packet transmissions or the remote system's response data packet transmissions. Additionally, the network 120 and network nodes 205a-n can also issue respective congestion alerts.

In embodiments, backup manager 310 can include a network analyzer 415 that can identify one or more device pairs (e.g., pairs between ports P1-N and remote device ports RP1-N). For example, the network analyzer 415 can issue discovery messages using a discovery protocol to identify the device pairs In further embodiments, the network analyzer 405 can generate network congestion models. The network congestion models can predict throughput and congestion levels of the established network paths 305a-n to the remote system 115. Specifically, the network analyzer 415 can identify network throughput and congestion patterns. For example, the throughput engine 417 can ingest throughput and congestion level information from network node alerts or the remote system's response signals (e.g., response packets) to identify any network or network node throughput and congestion level patterns.

The backup manager 310 can also include a backup controller 410 that queues data requiring remote backup in at least one of the data buffers Q1-N. Further, the backup controller 410 can queue and prioritize transmission of the data requiring remote backup based on the workload characteristics, the array's state metrics, and network/node throughput or congestion levels. Additionally, the controller 410 can prioritize data backup transmissions based on one or more of the workload models, IO/workload characteristics, data-related service levels, and the like.

For example, the controller 410 can include a bandwidth optimizer 411 that can generate one or more backup transmission models using the monitored IO workloads, the array's state metrics, the network's and network nodes' throughput/congestion levels, and the like. In embodiments, the optimizer 411 can include logic and/or circuitry that define a recurring neural network (RNN). The RNN can correlate the workload models, array state metrics, and the network's and network nodes' throughput/congestion levels to generate and store the backup transmission models in the manager's local memory 440. In embodiments, the RNN can be a Long Short-Term Memory (LSTM) network. The backup transmission models can provide information about anticipated IO workloads, anticipated state metrics, and corresponding port and network path throughput and congestion levels.

In embodiments, the bandwidth optimizer 411 can associate each backup transmission model to at least one of the array's runtime categories. The optimizer 411 can further correlate the backup transmission model and runtime category associations with the IO workload models. Each runtime category can identify at least one of the array's activity periods. For example, the activity periods can define a daily time window, day(s) of a week, and week (e.g., work hours, off-hours, business days, weekends, and holidays). Accordingly, the optimizer 411 can generate backup transmission schedules based on the backup transmission models, array's runtime categories, IO workload models.

In embodiments, the controller 410 can use the backup transmission schedules to prioritize backup transmissions dynamically. For example, the controller 410 can prioritize data packet backup transmission by dynamically assigning data packets to one of the ports P1-N and adjusting each of the buffer queues buffer durations. Specifically, the backup transmission schedules can provide the controller 410 with instructions to prioritize data packet backup transmission depending on one or more states of IO workloads, the volume of data per related service level, and network path throughput and congestion levels.

The following text includes details of one or more methods and/or flow diagrams in accordance with this disclosure. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter.

Figure 5:
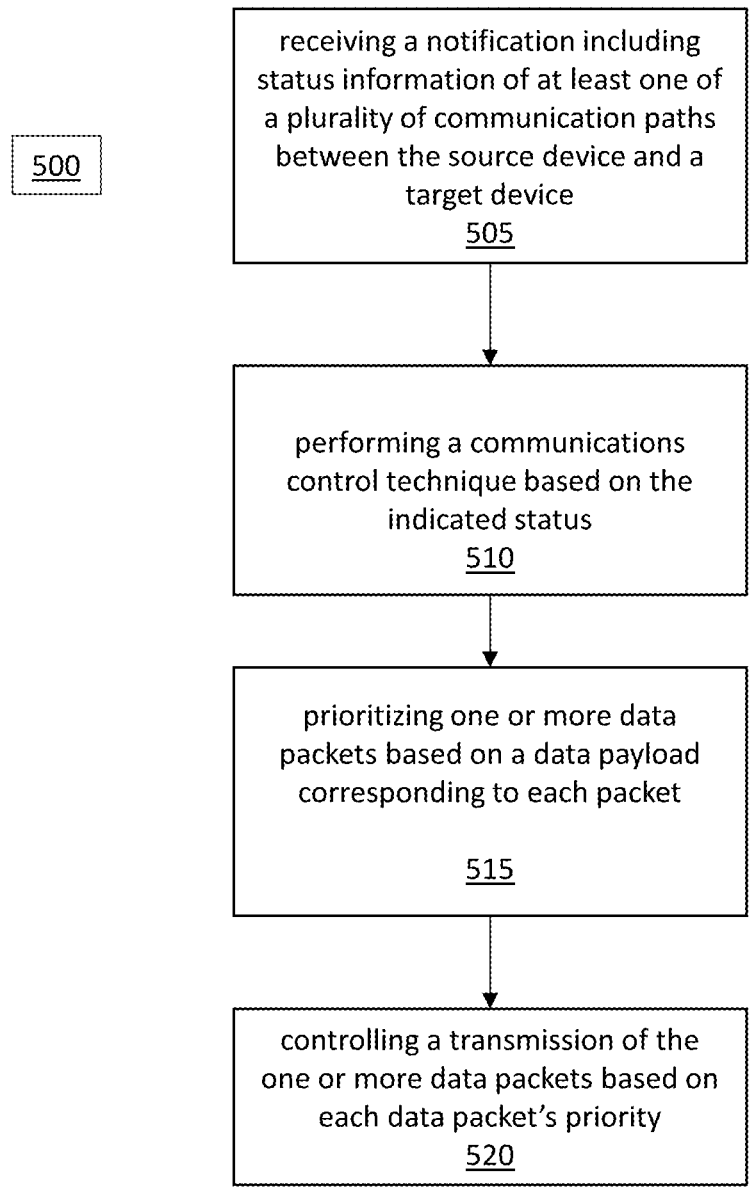
FIG. 5 is a flow diagram of a method for network communications between storage arrays in accordance with embodiments of the present disclosure.

Regarding FIG. 5, a method 500 can be executed by, e.g., an array's RA processor and/or any of the array's components (e.g., RA 140 and/or components 101, respectively, of FIG. 1). The method 500 describes steps controlling data communications between two or more devices over a network using at least one service level objective (SLO). At 505, the method 500 can include receiving, at a source device, a notification including status information of at least one of a plurality of communication paths between the source device and a target device. The method 500, at 510, can also include performing a communications control technique based on the indicated status. At 515, the method 500 can further include performing the communications control technique by prioritizing one or more data packets based on a data payload corresponding to each packet. The method 500, at 520, can include performing the communications control technique by also controlling transmissions of one or more of the data packets based on each data packet's priority. It should be noted that each step of the method 500 can include any combination of techniques implemented by the embodiments described herein.

Using the teachings disclosed herein, a skilled artisan can implement the above-described systems and methods in digital electronic circuitry, computer hardware, firmware, and/or software. The implementation can be as a computer program product. The implementation can, for example, be in a machine-readable storage device for execution by, or to control the operation of, data processing apparatus. The implementation can, for example, be a programmable processor, a computer, and/or multiple computers.

A computer program can be in any programming language, including compiled and/or interpreted languages. The computer program can have any deployed form, including a stand-alone program or as a subroutine, element, and/or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors and any one or more processors of any digital computer. Generally, a processor receives instructions and data from a read-only memory or a random-access memory or both. For example, a computer's essential elements are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

A computer having a display device that enables user interaction can implement the above-described techniques. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, and/or tactile input.

A distributed computing system that includes a back-end component can also implement the above-described techniques. The back-end component can, for example, be a data server, a middleware component, and/or an application server. Further, a distributing computing system that includes a front-end component can implement the above-described techniques. The front-end component can, for example, be a client computer having a graphical user interface, a Web browser through which a user can interact with an example implementation, and/or other graphical user interfaces for a transmitting device. The system's components can interconnect using any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), and/or other packet-based networks. Circuit-based networks can include, for example, a public switched telephone network (PSTN), a private branch exchange (PBX), a wireless network, and/or other circuit-based networks. Wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), and/or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, and/or plural forms of each are open-ended, include the listed parts, and contain additional elements that are not listed. And/or is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. Scope of the concepts is thus indicated by the appended claims rather than by the preceding description. Therefore, all changes embrace the meaning and range of equivalency of the claims.

What is claimed is:

1. A method comprising:
    receiving, at a source device, a notification including status information of at least one of a plurality of communication paths between the source device and a target device;
    determining at least one runtime category corresponding to the source device, wherein the at least one runtime category defines at least one activity period of the source device; and
    performing a communications control technique based on the indicated status and the at least one runtime category, where the communications control technique includes:
        prioritizing one or more data packets based on a data payload corresponding to each packet, wherein prioritizing the one or more data packets includes dynamically assigning the one or more data packets to one or more transmission ports of the source device,
        associating each of the one or more transmission ports of the source device with a respective port of one or more ports of the target device, wherein the associating is based on the at least one runtime category and current network conditions, and
        controlling transmission of the one or more data packets based on each data packet's priority, wherein controlling the transmission of the one or more data packets includes dynamically adjusting buffer durations corresponding to buffer queues of the one or more transmission ports based on the associated ports and the at least one runtime category.

2. The method of claim 1, further comprising: determining a throughput level of the one or more communication paths using the status information.

3. The method of claim 2, further comprising: grouping the one or more data packet based on each packet's priority.

4. The method of claim 3, further comprising: assigning each group of the one or more data packets to at least one communication path of the plurality of communication paths using the status information.

5. The method of claim 4, further comprising: controlling a transmission rate of each group of data packets based on at least the status information.

6. The method of claim 1, further comprising: identifying communication status patterns using information included in historical and/or current communication path notifications.

7. The method of claim 3, further comprising: generating one or more data transmission models from the identified patterns.

8. The method of claim 1, further comprising: controlling a transmission rate of the one or more data using the one or more data transmission models.

9. The method of claim 6, further comprising: using one or more machine learning (ML) techniques to identify the communication status patterns.

10. The method of claim 9, further comprising: adjusting the one or more data transmission models based on one or more transmission feedback notifications received from the target device.

11. An apparatus, including memory and processor, configured to:
    receive, at a source device, a notification including status information of at least one of a plurality of communication paths between the source device and a target device;
    determine at least one runtime category corresponding to the source device, wherein the at least one runtime category defines at least one activity period of the source device; and
    perform a communications control technique based on the indicated status and the at least one runtime category, where the communications control technique includes:
        prioritizing one or more data packets based on a data payload corresponding to each packet, wherein prioritizing the one or more data packets includes dynamically assigning the one or more data packets to one or more transmission ports of the source device,
        associating each of the one or more transmission ports of the source device with a respective port of one or more ports of the target device, wherein the associating is based on the at least one runtime category and current network conditions, and
        controlling transmission of the one or more data packets based on each data packet's priority, wherein controlling the transmission of the one or more data packets includes dynamically adjusting buffer durations corresponding to buffer queues of the one or more transmission ports based on the associated ports and the at least one runtime category.

12. The apparatus of claim 1, further configured to: determine a throughput level of the one or more communication paths using the status information.

13. The apparatus of claim 2, further configured to group the one or more data packets based on each packet's priority.

14. The apparatus of claim 3, further configured to: assign each group of the one or more data packets to at least one communication path of the plurality of communication paths using the status information.

15. The apparatus of claim 4, further configured to: control a transmission rate of each group of data packets based on at least the status information.

16. The apparatus of claim 1, further configured to: identify communication status patterns using information included in historical and/or current communication path notifications.

17. The apparatus of claim 3, further configured to: generate one or more data transmission models from the identified patterns.

18. The apparatus of claim 1, further configured to: control a transmission rate of the one or more data using the one or more data transmission models.

19. The apparatus of claim 6, further configured to: use one or more machine learning (ML) techniques to identify the communication status patterns.

20. The apparatus of claim 9, further configured to adjust the one or more data transmission models based on one or more transmission feedback notifications received from the target device.

* * * * *